(12) United States Patent
Yamaguchi

(10) Patent No.: US 7,972,723 B2
(45) Date of Patent: Jul. 5, 2011

(54) FLAT ALKALINE PRIMARY BATTERY

(75) Inventor: Norishige Yamaguchi, Chiba (JP)

(73) Assignee: Seiko Instruments Inc., Chiba-Shi, Chiba-Ken (JP)

( * ) Notice: Subject to any disclaimer, the term of this patent is extended or adjusted under 35 U.S.C. 154(b) by 0 days.

(21) Appl. No.: 12/829,015

(22) Filed: Jul. 1, 2010

(65) Prior Publication Data

US 2010/0266892 A1    Oct. 21, 2010

Related U.S. Application Data

(63) Continuation of application No. 12/036,698, filed on Feb. 25, 2008, and a continuation of application No. 12/036,748, filed on Feb. 25, 2008.

(30) Foreign Application Priority Data

Feb. 27, 2007  (JP) ................................. 2007-048075
Feb. 27, 2007  (JP) ................................. 2007-048076

(51) Int. Cl.
*H01M 4/52* (2010.01)
*H01M 6/12* (2010.01)

(52) U.S. Cl. .................. 429/206; 429/223; 429/220

(58) Field of Classification Search .................. 429/206
See application file for complete search history.

(56) References Cited

U.S. PATENT DOCUMENTS

| | | | |
|---|---|---|---|
| 5,601,944 A * | 2/1997 | Yamaguchi et al. | 429/174 |
| 5,965,296 A * | 10/1999 | Nishimura et al. | 429/231.8 |
| 6,902,847 B1 * | 6/2005 | Yata et al. | 429/231.8 |
| 2003/0232223 A1 * | 12/2003 | Leddy et al. | 429/10 |
| 2004/0237293 A1 * | 12/2004 | Durkot et al. | 29/730 |
| 2005/0153204 A1 * | 7/2005 | Fierro et al. | 429/223 |
| 2006/0046135 A1 * | 3/2006 | Huang | 429/128 |
| 2008/0206637 A1 | 8/2008 | Yamaguchi | |
| 2008/0292951 A1 | 11/2008 | Yamaguchi | |

FOREIGN PATENT DOCUMENTS

| | | |
|---|---|---|
| JP | 20046092 A | 1/2001 |
| JP | 2003234107 A | 8/2003 |
| JP | 200519349 A | 1/2005 |

* cited by examiner

*Primary Examiner* — Patrick Ryan
*Assistant Examiner* — Brent Thomas
(74) *Attorney, Agent, or Firm* — Seager, Tufte & Wickhem LLC

(57) ABSTRACT

A flat alkaline primary battery is provided. The annular end portion of the negative electrode can is engaged with the annular end portion of the positive electrode can so that the positive electrode can and the negative electrode can are connected via a gasket to create an enclosed space inside the cans. The enclosed space accommodates a separator, a positive electrode mixture having a positive electrode active material as a main component, and a negative electrode mixture having a negative electrode active material as a main component. The enclosed space is filled with an alkaline electrolyte. The positive electrode active material is oxy nickel hydroxide. The negative electrode active material is a zinc or zinc alloy powder. The mass of the oxy nickel hydroxide is between 3.9 and 4.4, times, inclusive, of the mass of the zinc or the zinc alloy. Alternatively, the mass of the oxy nickel hydroxide is between 3.3 times, inclusive, the mass of the zinc or the zinc alloy.

18 Claims, 1 Drawing Sheet

US 7,972,723 B2

FLAT ALKALINE PRIMARY BATTERY

CROSS-REFERENCE TO RELATED APPLICATIONS

This is a continuation application of U.S. application Ser. No. 12/036,748, filed Feb. 25, 2008, and of U.S. application Ser. No. 12/036,698, filed Feb. 25, 2008, which are respectively based upon and claim the benefit of priority from prior Japanese Patent Application No. 2007-048075, filed on Feb. 27, 2007, and from prior Japanese Patent Application No. 2007-048076, filed on Feb. 27, 2007, the entire content of which each of the foregoing US and Japanese applications is incorporated herein by reference.

FIELD OF THE INVENTION

The present invention relates to a flat alkaline primary battery.

BACKGROUND

In flat alkaline primary batteries such as coin-shaped batteries and button-shaped batteries used for compact electronics such as electronic wrist watches and portable electronic calculators, a positive electrode can contains a positive electrode mixture where manganese dioxide is used as a positive electrode active material and a negative electrode can contains a negative electrode mixture where zinc or zinc alloy powder is used as a negative electrode active material.

The positive electrode mixture and the negative electrode mixture face each other with a separator in between, and an alkaline electrolyte is injected inside the battery. The manganese dioxide in the positive electrode mixture, graphite powder, which is a conductive agent, and in the case where the binding properties of the positive electrode mixture are poor, a resin powder or emulsion such as polytetrafluoroethylene (PTFE), which is a binding agent, are mixed and then compressed into a pellet which is used as the positive electrode.

In addition, so-called silver oxide batteries where silver oxide is used as the positive electrode active material in flat alkaline primary batteries are widely available in the general market. Silver oxide has a high volume energy density compared to manganese dioxide, and the battery voltage where the positive electrode active material is silver oxide and the negative electrode active material is zinc is flat in the vicinity of 1.56 volts. Therefore, silver oxide is mainly used in power supplies for compact electronics such as electronic wrist watches and portable electronic calculators the final voltage of which is not lower than 1.2 volts.

Although silver oxide provides excellent performance, it is expensive because silver, which is a precious metal, is the main component and its price fluctuates depending on the market rate for silver. Thus, silver oxide is a difficult material for use in reducing or stabilizing the manufacturing cost. Therefore, a great number of so-called alkaline manganese batteries are spread in the general market as well as silver oxide batteries. The positive electrode active material in the alkaline manganese batteries is manganese dioxide, the price per mass of which is much less expensive, approximately one-two-hundredths of silver oxide, although the volume energy density of the alkaline manganese batteries is lower and the voltage drop due to discharge is greater than those of silver oxide.

In order to improve the above described performance of manganese dioxide, it has been studied that various additives are added to inexpensive active materials such as manganese dioxide (for example, see Japanese Unexamined Patent Publication No. 2003-234107, Japanese Unexamined Patent Publication No. 2004-6092, Japanese Unexamined Patent Publication No. 2005-19349).

Flat alkaline primary batteries where manganese dioxide is used as a positive electrode active material have a problem where the voltage drops greatly due to discharge. The voltage drop of manganese dioxide due to discharge causes the problem that the time of use in devices, such as electronic wrist watches where the final voltage is set to a high value for the voltage of silver oxide batteries, is extremely shortened. Although various studies have been conducted in order to prevent the voltage drop, satisfactory results have not been obtained.

SUMMARY

An object of the present invention is to provide an inexpensive and highly reliable flat alkaline primary battery where a high battery voltage is maintained, lifetime is long, and battery exhaustion is predictable.

According to an aspect of the invention, a flat alkaline primary battery is provided. The battery includes a positive electrode can having an annular end portion and a negative electrode can having an annular end portion. The annular end portion of the negative electrode can is engaged with the annular end portion of the positive electrode can so that the positive electrode can and the negative electrode can are connected via a gasket to create an enclosed space inside the cans. The enclosed space accommodates a separator, a positive electrode mixture having a positive electrode active material as a main component on the positive electrode can side, and a negative electrode mixture having a negative electrode active material as a main component on the negative electrode can side. The enclosed space in which the positive electrode mixture, the separator, the negative electrode mixture are disposed is filled with an alkaline electrolyte. The positive electrode active material is oxy nickel hydroxide. The negative electrode active material is a zinc or zinc alloy powder. The mass of the oxy nickel hydroxide is between 3.9 and 4.4 times, inclusive, the mass of the zinc or the zinc alloy, or alternatively between 3.3 and 3.8 times, inclusive, the mass of the zinc or the zinc alloy.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EXEMPLARY EMBODIMENTS

Figure 1:
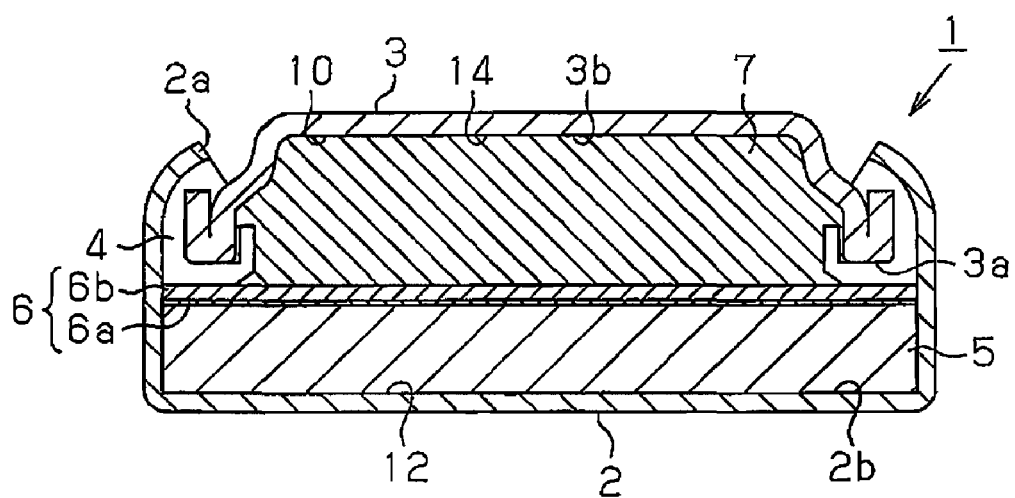
FIG. 1 is a schematic cross sectional view of an alkaline battery according to one embodiment of the present invention.

In the following, one embodiment of the present invention is described with reference to the drawing.

FIG. 1 is a schematic cross sectional view illustrating a button-shaped or flat alkaline primary battery. In FIG. 1, an alkaline primary battery 1 is a button-shaped primary battery and has a positive electrode can 2 in cylindrical form with a bottom and a negative electrode can 3 in cylindrical form with a lid. The positive electrode can 2 is made of a nickel-plated steel plate and works as a positive electrode terminal. Meanwhile, the negative electrode can 3 is formed of a three-layer clad material having an outer surface layer made of nickel, a metal layer made of stainless steel (SUS) and an electricity collector layer made of copper, which is pressed into a cup. In the negative electrode can 3, an end portion 3a, which is in annular or circular form, is formed by being folded, and a gasket 4 in ring form made of nylon, for example, is mounted on the circular end portion 3a.

The circular end portion 3a of the negative electrode can 3 on which the gasket 4 is mounted is fitted in a circular end portion 2a of the positive electrode can 2, and the circular end portion 2a of this positive electrode can 2 is caulked against the gasket 4 so that the positive electrode can 2 and the negative electrode can 3 are fixedly connected to each other with the connection being sealed. When the positive electrode can 2 and the negative electrode can 3 are fixedly connected with the gasket 4 in between in this manner, an airtight space 10 is created between them.

The enclosed space 10 accommodates a positive electrode mixture 5, a separator 6 and a negative electrode mixture 7 in such a manner that the positive electrode mixture 5 is placed on the side of the positive electrode can 2 and the negative electrode mixture 7 is placed on the side of the negative electrode can 3 with the separator 6 sandwiched therebetween. In more detail, in this embodiment, the separator 6 divides the enclosed space 10 into a first partial space 12 on the side of the positive electrode can 2 and a second partial space 14 on the side of the negative electrode can 3 in such a manner that the first partial space 12 contains the positive electrode mixture 5 and the second partial space 14 contains the negative electrode mixture 7. The enclosed space 10 is filled with an alkaline electrolyte.

In particular, the positive electrode mixture 5 is provided on the bottom surface 2b of the positive electrode can 2. The positive electrode mixture 5 has a pellet structure in columnar form which is formed by mixing an oxy nickel hydroxide powder, which is a positive electrode active material, graphite, which is a conductive agent, soda polyacrylate, which is a binding agent, and a potassium hydroxide solution, which is an electrolyte; and press forming the mixture using a tableting machine. The volume of the positive electrode mixture 5 is determined based on the basis of the volume ratio of the positive electrode mixture 5 to the negative electrode mixture 7. It is preferable for the volume of the positive electrode mixture 5 to be 2 to 3 times greater than the volume of the negative electrode mixture 7.

It is preferable for the mass of oxy nickel hydroxide, to be between 3.9 and 4.4 times, inclusive, the mass of zinc, which is the negative electrode active material in the negative electrode mixture 7 described in detail below. When the mass of oxy nickel hydroxide is less than 3.9 times greater than the mass of zinc, the discharge potential at the last stage of discharge is 1.55 V or lower. Meanwhile, when the battery is used in a device the final voltage of which is as high as 1.4 V, the operating time of the device becomes short, which is not desirable. Meanwhile, when the mass of oxy nickel hydroxide exceeds 4.4 times greater than the mass of zinc, the volume of the positive electrode becomes great and the volume of the negative electrode must be reduced by that volume, thus making the discharge volume small, which is undesirable.

Alternatively, it is preferable for the mass of oxy nickel hydroxide, to be between 3.3 and 3.8 times, inclusive, the mass of zinc, which is the negative electrode active material in the negative electrode mixture 7. With such a value, discharge potential at the rated resistance of tens of kΩ or higher is in two-stages: a first stage of 1.55 V to 1.80 V and a second stage of 1.20 V to 1.40 V. As a result, the alkaline primary battery 1 can be used for a long period of time in such devices as electronic wrist watches, where the final voltage is set high for the battery voltage of the flat silver oxide primary battery. In addition, battery exhaustion can be predicted using the potential of the second stage at the end of discharge.

When the mass of oxy nickel hydroxide is less than 3.3 times greater than the mass of zinc, the excess amount of the capacity of the positive electrode to that of the negative electrode is small. Thus, it is likely that the capacity of the negative electrode becomes greater than that of the positive electrode due to variations in manufacture or time degradation during storage. When the capacity of the negative electrode is greater than that of the positive electrode, in the case of overdischarge, a negative active material reacts with the electrolyte to generate hydrogen gas, causing undesirable destruction of the battery. Meanwhile, when the mass of oxy nickel hydroxide exceeds 3.8 times greater than the mass of zinc, the second stage of 1.20 V to 1.40 V disappears and prediction of battery exhaustion is impossible.

It is preferable for the particle diameter of oxy nickel hydroxide powder to be 5 μm or greater and 100 μm or smaller. When the particle diameter of the oxy nickel hydroxide is less than 5 μm, the particle diameter is too small, thus lowering the molding property of the positive electrode mixture 5. This may cause a problem with the anti-leaking properties due to the failure of preventing deformation of the outer peripheral portion of the positive electrode mixture 5 on the negative electrode side which supports the gasket 4 as described below when the battery is sealed, which is undesirable. Meanwhile, when the particle diameter of the oxy nickel hydroxide powder exceeds 100 μm, the specific surface area is reduced, and therefore, the reactivity of the active material is lowered and a problem occurs with the discharge properties at the time a heavy load is discharged, which is undesirable.

It is preferable for the ratio of particles of the oxy nickel hydroxide powder which pass through a 100 mesh to be 90% or higher and for the ratio of particles which pass through a 320 mesh to be 10% or lower. When the ratio of particles of the oxy nickel hydroxide powder which pass through a 100 mesh is less than 90%, the specific surface area is reduced, and therefore, the reactivity of the active material is lowered and a problem occurs with the discharge properties at the time a heavy load is discharged, which is undesirable as described above. Meanwhile, when the ratio of particles of the oxy nickel hydroxide powder which pass through a 320 mesh exceeds 10%, the particles are too small, lowering the molding properties of the positive electrode mixture 5, and a problem with the anti-leaking properties may occur due to the failure of preventing deformation of the outer peripheral portion of the positive electrode mixture 5 on the negative electrode side which support the gasket 4 when the battery is sealed.

It is preferable for the tap density of the oxy nickel hydroxide powder to be 2.0 g/cm$^3$ or higher and 2.5 g/cm$^3$ or lower. When the tap density is lower than 2.0 g/cm$^3$, the ease of compression of the positive electrode mixture 5 is lost and the positive electrode mixture 5 cannot be pressed to a mold having the required high density, making the discharge capacity low, which is undesirable. Meanwhile, it is very difficult to synthesize an oxy nickel hydroxide powder having a tap density exceeding 2.5 g/cm$^3$, and a technology for industrial mass production has not yet been established at this point.

It is preferable for the specific surface area of the oxy nickel hydroxide powder to be 10 m$^2$/g or larger and 20 m$^2$/g or smaller. When the specific surface area is smaller than 10 m²/g, the reactivity is lowered and a problem is caused with the discharge properties at the time a heavy load is discharged, which is undesirable. Meanwhile, when the specific surface area of the oxy nickel hydroxide powder exceeds 20 m²/g, the required amount of conductive agent increases as the specific surface area increases, and thus, the mixture ratio of the conductive agent in the positive electrode mixture 5 must be increased and the mixture ratio of the oxy nickel hydroxide powder, which is the active material, is lowered accordingly. Then the discharge capacity is lowered, which is undesirable.

It is preferable for the moisture content of the oxy nickel hydroxide powder to be 0.1% or higher and 3% or lower. This is because there are no advantages in terms of the properties even when the oxy nickel hydroxide powder is dried so that the moisture content becomes less than 0.1%, resulting in just consuming time and energy for drying, which is undesirable. Meanwhile, when the moisture content of the oxy nickel hydroxide powder exceeds 3%, the ease of weighing the positive electrode mixture 5 is lost, and the flowing properties of the powder into the press die for determining the mass become poor when the positive electrode mixture 5 is press-formed, and therefore, the inconsistency in the mass of the positive electrode mixture 5 becomes great and the mass of the oxy nickel hydroxide powder is reduced by the amount of moisture content, making the discharge capacity low, which is undesirable.

It is preferable for the repose angle of the oxy nickel hydroxide powder to be 20 degrees or greater and 40 degrees or smaller. It is very difficult to synthesize an oxy nickel hydroxide powder having a repose angle of less than 20 degrees, and no technology for industrial mass production has yet been established at this point. Meanwhile, when the repose angle of the oxy nickel hydroxide powder exceeds 40 degrees, the ease of weighing the positive electrode mixture 5 is lost, and the flowing properties of the powder into the press die for determining the mass become poor when the positive electrode mixture 5 is press-formed, and therefore, the inconsistency in the mass of the positive electrode mixture 5 becomes great, which is undesirable.

It is preferable for the pressure under which the oxy nickel hydroxide powder having a mass of 100 mg is pressed into a mold in columnar pellet form having an outer diameter of 6.42 mm and a thickness of 1 mm to be adjusted to 100 MPa or higher and 500 MPa or lower. When the pressure is less than 100 MPa, the strength of the positive electrode mixture 5 is lowered and deformation of the outer peripheral portion of the positive electrode mixture 5 on the negative electrode side which supports the gasket 4 when the battery is sealed cannot be prevented, and a problem with the anti-leaking properties may be caused, which is undesirable. Meanwhile, when the pressure exceeds 500 MPa, the pressure for pressing the positive electrode mixture 5 into a mold becomes too high, and therefore, the productivity when the positive electrode mixture 5 is pressed into a mold is lowered significantly, which is undesirable.

A solid oxy nickel hydroxide in which one or more materials selected from the group consisting of zinc, aluminum, calcium, manganese, cobalt, copper and tin is dissolved as a positive electrode active material may be used.

For example, 2% or higher and 5% or lower of zinc may be dissolved in solid oxy nickel hydroxide, and thus, β type oxy nickel hydroxide may be used as the positive electrode active material. This increases the degree of β conversion of oxy nickel hydroxide, and facilitates the growth of secondary crystal particles. As a result, expansion of the oxy nickel hydroxide in volume due to discharge is restricted, the amount of alkaline electrolyte required for discharge is reduced, and the density in which the positive electrode mixture is filled with oxy nickel hydroxide due to the growth of the secondary crystal particles can be increased, and thus, the discharge capacity can be increased.

It is preferable for the mixture ratio of graphite as the conductive agent which is added to the positive electrode mixture 5 to be 2% or higher and 5% or lower. It is preferable for the graphite to be a scale-like graphite powder. As a result, the discharge properties increase, the discharge potential (CCV) is improved, and in addition, the binding effects of oxy nickel hydroxide and the scale-like graphite powder can be used. As a result, it becomes possible to fabricate the positive electrode mixture 5 with a low mixture ratio of the binding agent, and accordingly, the discharge capacity can be increased. It is preferable for the size of the crystallite of the scale-like graphite powder in the direction of axis a La (110) to be 100 nm or smaller, the size in the direction of axis c La (004) to be 100 nm or smaller, and the volume specific resistance in the direction of axis c or the direction in which pressure is applied to be 30 mΩ·cm or lower when pressure of 150 MPa is applied.

It is preferable for the average particle diameter of the scale-like graphite powder to be 5 μm or greater and 100 μm or smaller, the ratio of powder which passes through a 320 mesh to be 10% or lower, and the ratio of powder which passes through a 100 mesh to be 90% or higher.

It is preferable for the mass ratio of the scale-like graphite powder to the positive electrode mixture 5 to be 2% or higher and 5% or lower. Furthermore, it is preferable for the mass ratio of the binding agents to the positive electrode mixture 5 to be 0.5% or lower when a scale-like graphite powder is used for the positive electrode mixture 5.

The separator 6 is placed on the upper side of the positive electrode mixture 5. The separator 6 has a two-layer structure of a microporous film 6a and an unwoven cloth 6b, and is impregnated with an alkaline electrolyte. By making the separator 6 in the two-layer structure, the barrier properties between the positive electrode and the negative electrode can be improved, so that the capacitance can be better maintained, and in addition, the alkaline electrolyte can be effectively maintained. Accordingly, the discharge properties can be increased.

It is preferable for the thickness of the microporous film 6a to be 20 μm or greater and 40 μm or smaller. It is preferable for the thickness of the unwoven cloth 6b to be 40 μm or greater and 150 μm or smaller. Furthermore, instead of one unwoven cloth 6b, a number of unwoven cloths may be layered. The microporous film 6a is not limited to but includes a graft film and cellophane.

The negative electrode mixture 7 is placed on the upper side of the separator 6. The negative electrode mixture 7 is in gel form, includes a zinc or zinc alloy powder, an alkaline electrolyte and a thickening agent, is compressed on the bottom surface 3b of the negative electrode can 3, and is contained on the upper side of the separator 6.

In addition, the mass of the zinc or zinc alloy is determined on the basis of the mass ratio of oxy nickel hydroxide to the zinc or zinc alloy, as described above, and this ratio is between 3.9 and 4.4 times, inclusive, or alternatively, between 3.3 and 3.8 times, inclusive.

The volume of the negative electrode mixture 7 is determined on the basis of the above volume ratio of the positive electrode mixture 5 to the negative electrode mixture 7. In other words, the volume of the positive electrode mixture 5 is 2 to 3 times greater than the volume of the negative electrode mixture 7.

The enclosed space containing the positive electrode mixture 5, the separator 6 and the negative electrode mixture 7 is filled with an alkaline electrolyte. A sodium hydroxide solution, a potassium hydroxide solution or a mixed solution of a sodium hydroxide solution and a potassium hydroxide solution, for example, may be used as the alkaline electrolyte.

The alkaline electrolyte may be mixed into the positive electrode mixture 5 in advance when the positive electrode mixture 5 is fabricated, before the alkaline electrolyte is injected when the battery is assembled in an assembling machine. As a result, the discharge properties and potential can be improved and the amount of alkaline electrolyte which is injected when the battery is assembled can be reduced. In addition, degradation of the anti-leaking properties when the positive electrode mixture 5 fails to absorb the alkaline electrolyte can be prevented.

Therefore, it is preferable for the concentration of the potassium hydroxide solution which is added to the positive electrode mixture 5 when the positive electrode mixture 5 is fabricated to be 30% or higher and 50% or lower. In that case, it is preferable for the mixture ratio of the potassium hydroxide solution which is added to the positive electrode mixture 5 to be 0.5% or higher and 4% or lower.

Meanwhile, when a sodium hydroxide solution is added when the positive electrode mixture 5 is fabricated, it is preferable for the concentration of the sodium hydroxide solution to be 20% or higher and 40% or lower. In that case, it is preferable for the mixture ratio of the sodium hydroxide solution which is added to the positive electrode mixture 5 to be 0.5% or higher and 4% or lower.

Incidentally, it is preferable for the mass ratio of the alkaline electrolyte which is injected when the battery is assembled to be 1/20 to 1/10 of the mass of the above described positive electrode mixture 5. In addition, when the alkaline electrolyte is a potassium hydroxide solution when the battery is assembled, it is preferable for the concentration of the potassium hydroxide solution to be 30% or higher and 50% or lower. When the alkaline electrolyte when the battery is assembled is a sodium hydroxide solution, it is preferable for the concentration of the sodium hydroxide solution to be 20% or higher and 40% or lower.

In the flat alkaline primary battery 1 formed in this manner, the mass of the oxy nickel hydroxide, which is the positive electrode active material in the positive electrode mixture 5, is between 3.9 and 4.4 times, inclusive, the mass of the zinc or zinc alloy, or alternatively between 3.3 and 4.8 times, inclusive, the mass of the zinc or zinc alloy, which is the negative electrode active material in the negative electrode mixture 7. Then, when the flat alkaline primary battery 1 is discharged with several tens of kΩ or higher, a discharge potential of as high as 1.55 V to 1.80 V can be obtained, and in addition, flat discharge properties as those of silver oxide primary batteries can be obtained. As a result, the alkaline primary battery 1 can be used for a long period of time in such devices as electronic wrist watches, where the final voltage is set high for the battery voltage of the flat silver oxide primary battery. With the alternative ratio, when the flat alkaline primary battery 1 is discharged with tens of kΩ or higher, a discharge potential takes two-stages at the end of discharge: a first stage of 1.55 V to 1.80 V and a second stage of 1.20 V to 1.40 V. In addition, battery exhaustion can be predicted using a potential of the second stage at the end of discharge.

The present invention is examined by providing examples where various conditions for oxy nickel hydroxide are changed.

Example 1

In the battery structure as illustrated in FIG. 1, the negative electrode can 3 was formed by press-forming a clad material having a thickness of 0.18 mm and three layers of a nickel outer surface layer, a metal layer made of stainless steel (SUS) and an electricity collector layer made of copper. The positive electrode mixture 5 was formed by mixing 4% of graphite, which is a conductive agent, 93.8% of oxy nickel hydroxide having an average particle diameter of 15 µm, 0.2% of soda polyacrylate, which is a binding agent, and 2% of a potassium hydroxide solution with a concentration of 40%, which is an electrolyte, using a blender, and after that, molding the mixture to a pellet using a tableting machine. Next, the positive electrode mixture 5 was inserted into the positive electrode can 2, into which an alkaline electrolyte containing potassium hydroxide was injected, so that the alkaline electrolyte was absorbed by the positive electrode mixture 5. In Example 1, the mass of the oxy nickel hydroxide was 4.0 times greater than the mass of the zinc, which is the negative electrode active material described below. In Example 1 with the alternative ratio, the mass of the oxy nickel hydroxide was 3.6 times greater than the mass of the zinc, which is the negative electrode active material described below.

The tap density of the oxy nickel hydroxide was 2.3 g/cm$^3$, the specific surface area was 16 m$^2$/g, the moisture content was 0.6%, the repose angle was 22 degrees, and in terms of the compression properties, the pressure for processing oxy nickel hydroxide the mass of which was 100 mg into columnar pellet having an outer diameter of 6.42 mm and a thickness of 1 mm was 300 MPa.

A separator 6 formed by punching out a two-layer structure of a microporous film 6a and an unwoven cloth 6b in circular form was mounted on the positive electrode mixture 5. The separator 6 thus mounted was then impregnated with an alkaline electrolyte including potassium hydroxide, by dripping the electrolyte onto the separator 6. A negative electrode mixture 7 in gel form made of a zinc alloy powder, zinc oxide, a thickening agent, sodium hydroxide, potassium hydroxide and water was placed on the separator 6. Then, the negative electrode can 3 and the positive electrode can 2 were caulked together so that the cans 2 and 3 were sealed to form a flat alkaline primary battery 1. A gasket 4 was sandwiched between the positive electrode can 2 and the negative electrode can 3 so as to improve the sealing properties.

Example 2

Example 2 provides the same configuration as Example 1 except that the mass of the oxy nickel hydroxide powder mixed into the positive electrode mixture 5 was 3.9 times greater than the mass of the zinc, which is the negative electrode active material. In Example 2, with the alternative ratio, the mass of the oxy nickel hydroxide powder mixed into the positive electrode mixture 5 was 3.3 times greater than the mass of the zinc, which is the negative electrode active material.

Example 3

Example 3 provides the same configuration as Example 1 except that the mass of the oxy nickel hydroxide powder mixed into the positive electrode mixture 5 was 4.4 times greater than the mass of the zinc, which is the negative electrode active material. In Example 3 with the alternative embodiment, the mass of the oxy nickel hydroxide powder mixed into the positive electrode mixture 5 was 3.8 times greater than the mass of the zinc, which is the negative electrode active material.

Example 4

Example 4 provides the same configuration as Example 1 except that the average particle diameter of the oxy nickel hydroxide powder mixed into the positive electrode mixture 5 was 5 μm.

Example 5

Example 5 provides the same configuration as Example 1 except that the average particle diameter of the oxy nickel hydroxide powder mixed into the positive electrode mixture 5 was 100 μm.

Example 6

Example 6 provides the same configuration as Example 1 except that the ratio of particles of the oxy nickel hydroxide powder mixed into the positive electrode mixture 5 which pass through a 100 mesh was 90% or higher.

Example 7

Example 7 provides the same configuration as Example 1 except that the ratio of particles of the oxy nickel hydroxide powder mixed into the positive electrode mixture 5 which pass through a 320 mesh was 10% or lower.

Example 8

Example 8 provides the same configuration as Example 1 except that the tap density of the oxy nickel hydroxide powder mixed into the positive electrode mixture 5 was 2.0 g/cm$^3$.

Example 9

Example 9 provides the same configuration as Example 1 except that the tap density of the oxy nickel hydroxide powder mixed into the positive electrode mixture 5 was 2.5 g/cm$^3$.

Example 10

Example 10 provides the same configuration as Example 1 except that the specific surface area of the oxy nickel hydroxide powder mixed into the positive electrode mixture 5 was 10 m$^2$/g.

Example 11

Example 11 provides the same configuration as Example 1 except that the specific surface area of the oxy nickel hydroxide powder mixed into the positive electrode mixture 5 was 20 m$^2$/g.

Example 12

Example 12 provides the same configuration as Example 1 except that the moisture content of the oxy nickel hydroxide powder mixed into the positive electrode mixture 5 was 0.1%.

Example 13

Example 13 provides the same configuration as Example 1 except that the moisture content of the oxy nickel hydroxide powder mixed into the positive electrode mixture 5 was 3%.

Example 14

Example 14 provides the same configuration as Example 1 except that the repose angle of the oxy nickel hydroxide powder mixed into the positive electrode mixture 5 was 20 degrees.

Example 15

Example 15 provides the same configuration as Example 1 except that the repose angle of the oxy nickel hydroxide powder mixed into the positive electrode mixture 5 was 40 degrees.

Example 16

Example 16 provides the same configuration as Example 1 except that the pressure for processing the oxy nickel hydroxide powder the mass of which was 100 mg and which was mixed into the positive electrode mixture 5 to a columnar pellet having an outer diameter of 6.42 mm and a thickness of 1 mm was 100 MPa.

Example 17

Example 17 provides the same configuration as Example 1 except that the pressure for processing the oxy nickel hydroxide powder the mass of which was 100 mg and which was mixed into the positive electrode mixture 5 to a columnar pellet having an outer diameter of 6.42 mm and a thickness of 1 mm was 500 MPa.

Example 18

Example 18 provides the same configuration as Example 1 except that the average particle diameter of the oxy nickel hydroxide powder mixed into the positive electrode mixture 5 was 1 μm.

Example 19

Example 19 provides the same configuration as Example 1 except that the average particle diameter of the oxy nickel hydroxide powder mixed into the positive electrode mixture 5 was 120 μm.

Example 20

Example 20 provides the same configuration as Example 1 except that the ratio of particles of the oxy nickel hydroxide powder mixed into the positive electrode mixture 5 which pass through a 100 mesh was 80%.

Example 21

Example 21 provides the same configuration as Example 1 except that the ratio of particles of the oxy nickel hydroxide powder mixed into the positive electrode mixture 5 which pass through a 320 mesh was 20%.

Example 22

Example 22 provides the same configuration as Example 1 except that the tap density of the oxy nickel hydroxide powder mixed into the positive electrode mixture 5 was 1.8 g/cm³.

Example 23

Example 23 provides the same configuration as Example 1 except that the specific surface area of the oxy nickel hydroxide powder mixed into the positive electrode mixture 5 was 5 m²/g.

Example 24

Example 24 provides the same configuration as Example 1 except that the specific surface area of the oxy nickel hydroxide powder mixed into the positive electrode mixture 5 was 30 m²/g.

Example 25

Example 25 provides the same configuration as Example 1 except that the moisture content of the oxy nickel hydroxide powder mixed into the positive electrode mixture 5 was 0.05%.

Example 26

Example 26 provides the same configuration as Example 1 except that the moisture content of the oxy nickel hydroxide powder mixed into the positive electrode mixture 5 was 5%.

Example 27

Example 27 provides the same configuration as Example 1 except that the repose angle of the oxy nickel hydroxide powder mixed into the positive electrode mixture 5 was 50 degrees.

Example 28

Example 28 provides the same configuration as Example 1 except that the pressure for processing the oxy nickel hydroxide powder the mass of which was 100 mg and which was mixed into the positive electrode mixture 5 to a columnar pellet having an outer diameter of 6.42 mm and a thickness of 1 mm was 50 MPa.

Comparative Example 1

Comparative Example 1 provides the same configuration as Example 1 except that the mass of the oxy nickel hydroxide powder mixed into the positive electrode mixture 5 was 3.1 times greater than the mass of the zinc, which is the negative electrode active material.

Comparative Example 2

Comparative Example 2 provides the same configuration as Example 1 except that the mass of the oxy nickel hydroxide powder mixed into the positive electrode mixture 5 was 4.7 times greater than the mass of the zinc, which is the negative electrode active material. For comparison with the alternative ratio, the mass of the oxy nickel hydroxide powder mixed into the positive electrode mixture 5 was 4.0 times greater than the mass of the zinc, which is the negative electrode active material.

Then, 210 alkaline batteries were fabricated according to each of the above described Examples 1 to 17 and Comparative Examples 1 and 2 and examined as follows.

Specifically, 100 alkaline batteries according to each were preserved in a harsh environment of a temperature of 45 degrees C. and a relative humidity of 93%, and the ratio of leakage was measured after 80 days and 100 days. The results are shown in Table 1 and in Table 2 for the alternative ratio.

100 batteries each were discharged with a constant resistance of 30 kΩ. The discharge capacity [mAh] when the final voltage was 1.4 V is shown in the tables. Finally, the voltage [V] of 10 batteries each in a closed circuit (discharge properties) in an environment of −10 degrees C. with a DoD (depth of discharge) of 40% and a load resistance of 200Ω 5 seconds after connection is shown in Tables 1 and 2.

TABLE 1

| | average grain diameter (μm) | Ratio (%) 100 mesh | Ratio (%) 320 mesh | tap density (g/cm³) | specific surface area m²/g | moisture content (%) | repose angle | compression properties (MPa) | mass ratio NiOOH/Zn | ratio of leakage (%) after 80 days | ratio of leakage (%) after 100 days | initial capacity (mAh) average | initial capacity (mAh) standard deviation | CCV (V), DoD of 40% |
|---|---|---|---|---|---|---|---|---|---|---|---|---|---|---|
| Example 1 | 15 | 95 | 5 | 2.3 | 16 | 0.6 | 22 | 300 | 4.0 | 0 | 0 | 24.4 | 0.3 | 1.62 |
| Example 2 | 15 | 95 | 5 | 2.3 | 16 | 0.6 | 22 | 300 | 3.9 | 0 | 0 | 24.0 | 0.3 | 1.62 |
| Example 3 | 15 | 95 | 5 | 2.3 | 16 | 0.6 | 22 | 300 | 4.4 | 0 | 0 | 23.8 | 0.3 | 1.62 |
| Example 4 | 5 | 95 | 5 | 2.3 | 16 | 0.6 | 22 | 300 | 4.0 | 0 | 0 | 24.3 | 0.3 | 1.62 |
| Example 5 | 100 | 95 | 5 | 2.3 | 16 | 0.6 | 22 | 300 | 4.0 | 0 | 0 | 24.4 | 0.3 | 1.59 |
| Example 6 | 15 | 90 | 5 | 2.3 | 16 | 0.6 | 22 | 300 | 4.0 | 0 | 0 | 24.3 | 0.3 | 1.59 |
| Example 7 | 15 | 95 | 10 | 2.3 | 16 | 0.6 | 22 | 300 | 4.0 | 0 | 0 | 24.2 | 0.3 | 1.62 |
| Example 8 | 15 | 95 | 5 | 2.0 | 16 | 0.6 | 22 | 300 | 4.0 | 0 | 0 | 24.3 | 0.3 | 1.62 |
| Example 9 | 15 | 95 | 5 | 2.5 | 16: | 0.6 | 22 | 300 | 4.0 | 0 | 0 | 24.1 | 0.3 | L62 |
| Example 10 | 15 | 95 | 5 | 2.3 | 10 | 0.6 | 22 | 300 | 4.0 | 0 | 0 | 24.3 | 0.3 | 1.57 |
| Example 11 | 15 | 95 | 5 | 2.3 | 20 | 0.6 | 22 | 300 | 4.0 | 0 | 0 | 23.2 | 0.3 | 1.62 |
| Example 12 | 15 | 95 | 5 | 2.3 | 16 | 0.1 | 22 | 300 | 4.0 | 0 | 0 | 24.4 | 0.2 | 1.62 |
| Example 13 | 15 | 95 | 5 | 2.3 | 16 | 3 | 22 | 300 | 4.0 | 0 | 0 | 23.4 | 0.3 | 1.62 |
| Example 14 | 15 | 95 | 5 | 2.3 | 16 | 0.6 | 22 | 300 | 4.0 | 0 | 0 | 24.3 | 0.3 | 1.62 |
| Example 15 | 15 | 95 | 5 | 2.3 | 16 | 0.6 | 40 | 300 | 4.0 | 0 | 0 | 24.3 | 0.5 | 1.62 |
| Example 16 | 15 | 95 | 5 | 2.3 | 16 | 0.6 | 22 | 100 | 4.0 | 0 | 2 | 24.3 | 0.3 | 1.62 |
| Example 17 | 15 | 95 | 5 | 2.3 | 16 | 0.6 | 22 | 500 | 4.0 | 0 | 0 | 24.3 | 0.3 | 1.62 |
| Example 18 | 1 | 95 | 5 | 2.3 | 16 | 0.6 | 22 | 300 | 4.0 | 2 | 7 | 24.4 | 0.3 | 1.62 |
| Example 19 | 120 | 95 | 5 | 2.3 | 16 | 0.6 | 22 | 300 | 4.0 | 0 | 0 | 24.3 | 0.3 | 1.57 |

TABLE 1-continued

|  | average grain diameter (μm) | Ratio (%) 100 mesh | Ratio (%) 320 mesh | tap density (g/cm³) | specific surface area m²/g) | moisture content (%) | repose angle | compression properties (MPa) | mass ratio NiOOH/Zn | ratio of leakage (%) after 80 days | ratio of leakage (%) after 100 days | initial capacity (mAh) average | initial capacity (mAh) standard deviation | CCV (V), DoD of 40% |
|---|---|---|---|---|---|---|---|---|---|---|---|---|---|---|
| Example 20 | 15 | 80 | 5 | 2.3 | 16 | 0.6 | 22 | 300 | 4.0 | 0 | 0 | 24.3 | 0.3 | 1.57 |
| Example 21 | 15 | 95 | 20 | 2.3 | 16 | 0.6 | 22 | 300 | 4.0 | 0 | 6 | 24.2 | 0.3 | 1.62 |
| Example 22 | 15 | 95 | 5 | 1.8 | 16 | 0.6 | 22 | 300 | 4.0 | 0 | 5 | 23.3 | 0.3 | 1.62 |
| Example 23 | 15 | 95 | 5 | 2.3 | 5 | 0.6 | 22 | 300 | 4.0 | 0 | 0 | 24.2 | 0.3 | 1.47 |
| Example 24 | 15 | 95 | 5 | 2.3 | 30 | 0.6 | 22 | 300 | 4.0 | 0 | 0 | 23.0 | 0.3 | 1.62 |
| Example 25 | 15 | 95 | 5 | 2.3 | 16 | 0.05 | 22 | 300 | 4.0 | 0 | 0 | 24.3 | 0.3 | 1.62 |
| Example 26 | 15 | 95 | 5 | 2.3 | 16 | 5 | 22 | 300 | 4.0 | 0 | 0 | 22.4 | 0.6 | 1.62 |
| Example 27 | 15 | 95 | 5 | 2.3 | 16 | 0.6 | 50 | 300 | 4.0 | 0 | 0 | 24.3 | 0.6 | 1.62 |
| Example 28 | 15 | 95 | 5 | 2.3 | 16 | 0.6 | 22 | 50 | 4.0 | 2 | 10 | 24.2 | 0.3 | 1.62 |
| Comparative Example 1 | 15 | 95 | 5 | 2.3 | 16 | 0.6 | 22 | 300 | 3.1 | 0 | 0 | 24.2 | 0.3 | 1.62 |
| Comparative Example 2 | 15 | 95 | 5 | 2.3 | 16 | 0.6 | 22 | 300 | 4.7 | 0 | 0 | 20.0 | 0.3 | 1.62 |

TABLE 2

|  | average grain diameter (μm) | Ratio (%) 100 mesh | Ratio (%) 320 mesh | tap density (g/cm³) | specific surface area m²/g) | moisture content (%) | repose angle | compression properties (MPa) | mass ratio NiOOH/Zn | ratio of leakage (%) after 80 days | ratio of leakage (%) after 100 days | initial capacity (mAh) average | initial capacity (mAh) standard deviation | CCV (V), DoD of 40% | possibility of breakage |
|---|---|---|---|---|---|---|---|---|---|---|---|---|---|---|---|
| Example 1 | 15 | 95 | 5 | 2.3 | 16 | 0.6 | 22 | 300 | 3.6 | 0 | 0 | 26.5 | 0.3 | 1.62 | no |
| Example 2 | 15 | 95 | 5 | 2.3 | 16 | 0.6 | 22 | 300 | 3.3 | 0 | 0 | 26.1 | 0.3 | 1.62 | no |
| Example 3 | 15 | 95 | 5 | 2.3 | 16 | 0.6 | 22 | 300 | 3.8 | 0 | 0 | 24.5 | 0.3 | 1.62 | no |
| Example 4 | 5 | 95 | 5 | 2.3 | 16 | 0.6 | 22 | 300 | 3.6 | 0 | 0 | 26.3 | 0.3 | 1.62 | no |
| Example 5 | 100 | 95 | 5 | 2.3 | 16 | 0.6 | 22 | 300 | 3.6 | 0 | 0 | 26.4 | 0.3 | 1.59 | no |
| Example 6 | 15 | 90 | 5 | 2.3 | 16 | 0.6 | 22 | 300 | 3.6 | 0 | 0 | 26.3 | 0.3 | 1.59 | no |
| Example 7 | 15 | 95 | 10 | 2.3 | 16 | 0.6 | 22 | 300 | 3.6 | 0 | 0 | 26.3 | 0.3 | 1.62 | no |
| Example 8 | 15 | 95 | 5 | 2.0 | 16 | 0.6 | 22 | 300 | 3.6 | 0 | 0 | 26.3 | 0.3 | 1.62 | no |
| Example 9 | 15 | 95 | 5 | 2.5 | 16: | 0.6 | 22 | 300 | 3.6 | 0 | 0 | 26.2 | 0.3 | 1.62 | no |
| Example 10 | 15 | 95 | 5 | 2.3 | 10 | 0.6 | 22 | 300 | 3.6 | 0 | 0 | 26.4 | 0.3 | 1.57 | no |
| Example 11 | 15 | 95 | 5 | 2.3 | 20 | 0.6 | 22 | 300 | 3.6 | 0 | 0 | 25.2 | 0.3 | 1.62 | no |
| Example 12 | 15 | 95 | 5 | 2.3 | 16 | 0.1 | 22 | 300 | 3.6 | 0 | 0 | 26.3 | 0.2 | 1.62 | no |
| Example 13 | 15 | 95 | 5 | 2.3 | 16 | 3 | 22 | 300 | 3.6 | 0 | 0 | 25.5 | 0.3 | 1.62 | no |
| Example 14 | 15 | 95 | 5 | 2.3 | 16 | 0.6 | 22 | 300 | 3.6 | 0 | 0 | 26.3 | 0.3 | 1.62 | no |
| Example 15 | 15 | 95 | 5 | 2.3 | 16 | 0.6 | 40 | 300 | 3.6 | 0 | 0 | 26.2 | 0.5 | 1.62 | no |
| Example 16 | 15 | 95 | 5 | 2.3 | 16 | 0.6 | 22 | 100 | 3.6 | 0 | 2 | 26.3 | 0.3 | 1.62 | no |
| Example 17 | 15 | 95 | 5 | 2.3 | 16 | 0.6 | 22 | 500 | 3.6 | 0 | 0 | 26.3 | 0.3 | 1.62 | no |
| Example 18 | 1 | 95 | 5 | 2.3 | 16 | 0.6 | 22 | 300 | 3.6 | 2 | 7 | 26.4 | 0.3 | 1.62 | no |
| Example 19 | 120 | 95 | 5 | 2.3 | 16 | 0.6 | 22 | 300 | 3.6 | 0 | 0 | 26.2 | 0.3 | 1.57 | no |
| Example 20 | 15 | 80 | 5 | 2.3 | 16 | 0.6 | 22 | 300 | 3.6 | 0 | 0 | 26.2 | 0.3 | 1.57 | no |
| Example 21 | 15 | 95 | 20 | 2.3 | 16 | 0.6 | 22 | 300 | 3.6 | 0 | 6 | 26.3 | 0.3 | 1.62 | no |
| Example 22 | 15 | 95 | 5 | 1.8 | 16 | 0.6 | 22 | 300 | 3.6 | 0 | 5 | 25.5 | 0.3 | 1.62 | no |
| Example 23 | 15 | 95 | 5 | 2.3 | 5 | 0.6 | 22 | 300 | 3.6 | 0 | 0 | 26.3 | 0.3 | 1.47 | no |
| Example 24 | 15 | 95 | 5 | 2.3 | 30 | 0.6 | 22 | 300 | 3.6 | 0 | 0 | 25.1 | 0.3 | 1.62 | no |
| Example 25 | 15 | 95 | 5 | 2.3 | 16 | 0.05 | 22 | 300 | 3.6 | 0 | 0 | 26.2 | 0.3 | 1.62 | no |
| Example 26 | 15 | 95 | 5 | 2.3 | 16 | 5 | 22 | 300 | 3.6 | 0 | 0 | 24.2 | 0.6 | 1.62 | no |
| Example 27 | 15 | 95 | 5 | 2.3 | 16 | 0.6 | 50 | 300 | 3.6 | 0 | 0 | 26.3 | 0.6 | 1.62 | no |
| Example 28 | 15 | 95 | 5 | 2.3 | 16 | 0.6 | 22 | 50 | 3.6 | 2 | 10 | 26.2 | 0.3 | 1.62 | no |
| Comparative Example 1 | 15 | 95 | 5 | 2.3 | 16 | 0.6 | 22 | 300 | 3.1 | 0 | 0 | 25.2 | 0.3 | 1.62 | yes |
| Comparative Example 2 | 15 | 95 | 5 | 2.3 | 16 | 0.6 | 22 | 300 | 4.0 | 0 | 0 | 22.1 | 0.3 | 1.55 | no |

(1) First, Examples 1 to 5 and Example 18 in the tables were compared. It was found that the degradation of anti-leaking properties can be prevented by adjusting the average particle diameter of the oxy nickel hydroxide powder mixed into the positive electrode mixture 5 to from 5 μm to 100 μm. This is probably because deformation of the outer peripheral portion of the positive electrode mixture 5 on the negative electrode side which supports the gasket 4 when the battery is sealed can be prevented, and thus, the gasket 4 can be kept in a compressed state.

(2) Next, Examples 1 to 5 and Example 19 in the tables were compared. It was found that the degradation of voltage properties in a closed circuit can be prevented by adjusting the average particle diameter of the oxy nickel hydroxide powder mixed into the positive electrode mixture 5 to from 5 μm to 100 μm. This is probably because decrease in the reactivity of the oxy nickel hydroxide powder can be prevented when the average particle diameter of the oxy nickel hydroxide powder is 100 μm or smaller.

(3) Next, Examples 6, 7 and 20 in the tables were compared. It was found that degradation of the voltage properties in a closed circuit can be prevented by adjusting the ratio of the oxy nickel hydroxide powder mixed into the positive electrode mixture 5 which passes through a 100 mesh to 90% or higher and the ratio of the powder which passes through a 320 mesh to 10% or lower. Again, this is probably because the decrease in the reactivity of the oxy nickel hydroxide powder can be prevented when the ratio of the oxy nickel hydroxide powder mixed into the positive electrode mixture 5 which passes through a 100 mesh is adjusted to 90% or higher.

(4) Next, Examples 6, 7 and 21 in the tables were compared. It was found that the degradation of the anti-leaking properties can be prevented by adjusting the ratio of the oxy nickel hydroxide powder mixed into the positive electrode mixture 5 which passes through a 100 mesh to 90% or higher and the ratio of the powder which passes through a 320 mesh to 10% or lower. Again, this is probably because deformation of the outer peripheral portion of the positive electrode mixture 5 on the negative electrode side which supports the gasket 4 when the battery is sealed can be prevented, and thus, the gasket 4 can be kept in a compressed state.

(5) Next, Examples 8, 9 and 22 in the tables were compared. It was found that the degradation of anti-leaking properties can be prevented by adjusting the tap density of the oxy nickel hydroxide powder mixed into the positive electrode mixture 5 to 2.0 g/cm$^3$ or higher and 2.5 g/cm$^3$ or lower. This is also because deformation of the outer peripheral portion of the positive electrode mixture 5 on the negative electrode side which supports the gasket 4 when the battery is sealed can be prevented, and thus, the gasket 4 can be kept in a compressed state.

(6) Next, Examples 10, 11 and 23 in the tables were compared. It was found that the degradation of voltage properties in a closed circuit can be prevented by adjusting the specific surface area of the oxy nickel hydroxide powder mixed into the positive electrode mixture 5 to 10 m$^2$/g or higher and 20 m$^2$/g or lower. This is probably because the decrease in the reactivity of the oxy nickel hydroxide powder, can be prevented when the specific surface area of the oxy nickel hydroxide powder is adjusted to 10 m$^2$/g or higher.

(7) Next, Examples 10, 11 and 24 in the tables were compared. It was found that reduction in the discharge capacity can be prevented by adjusting the specific surface area of the oxy nickel hydroxide powder mixed into the positive electrode mixture 5 to 10 m$^2$/g or higher and 20 m$^2$/g or lower. This is probably because the decrease in the reactivity of the oxy nickel hydroxide powder, which is in the positive electrode mixture 5, can be prevented when the specific surface area of the oxy nickel hydroxide powder is adjusted to 20 m$^2$/g or lower, without increasing the mixture ratio of the conductive agent in the positive electrode mixture 5.

(8) Next, Examples 12, 13 and 25 in the tables were compared. It was confirmed that no advantages can be obtained in terms of the properties, even when the moisture content in the oxy nickel hydroxide powder mixed into the positive electrode mixture 5 is 0.1% or lower.

(9) Next, Examples 12, 13 and 26 in the tables were compared. It was found that the reduction of the discharge capacity can be prevented by adjusting the moisture content in the oxy nickel hydroxide powder mixed into the positive electrode mixture 5 to 0.1% or higher and 3% or lower. This is because reducing the mass of the oxy nickel hydroxide by the amount of moisture is unnecessary when the moisture content of the oxy nickel hydroxide powder is adjusted to 3% or lower.

(10) Next, Examples 14, 15 and 27 in the tables were compared. It was found that inconsistency in the discharge capacity can be reduced by adjusting the repose angle of the oxy nickel hydroxide powder mixed into the positive electrode mixture 5 to 20 degrees or greater and 40 degrees or smaller. This is probably because the ease of weighing the positive electrode mixture 5 can be maintained when the repose angle of the oxy nickel hydroxide powder is adjusted to 40 degrees or smaller.

(11) Next, Examples 16, 17 and 28 in the tables were compared. It was found that the degradation of the anti-leaking properties can be prevented by adjusting the pressure for processing the oxy nickel hydroxide powder the mass of which is 100 mg and which is mixed into the positive electrode mixture 5 to a columnar pellet having an outer diameter of 6.42 mm and a thickness of 1 mm to 100 MPa or higher and 500 MPa or lower. This is probably because deformation of the outer peripheral portion on the negative electrode side can be prevented, so that the gasket 4 can be kept being compressed when the pressure for processing the powder to a pellet is 100 MPa or higher.

(12) Finally, Examples 1 to 3 and Comparative Examples 1 and 2 in the tables were compared. It was found that the discharge capacity when the final voltage is 1.4 V is increased and the degradation of the voltage properties in a closed circuit can be prevented when the mass of the oxy nickel hydroxide is between 3.9 and 4.4 times, inclusive, the mass of the zinc.

With the alternative ratio, it was found that the discharge capacity when the final voltage is 1.2 V is improved and the degradation of the voltage properties in a closed circuit can be prevented when the mass of the oxy nickel hydroxide is between 3.3 and 3.8 times, inclusive, the mass of the zinc. In addition, battery exhaustion can be predicted using a potential of the second stage at the end of discharge. This is because, by setting a mass ratio of oxy nickel hydroxide to zinc appropriately, a discharge potential at tens of kΩ or higher takes two-stages: a first stage of 1.55 V to 1.80 V and a second stage of 1.20 V to 1.40 V.

The present embodiments as constructed above have the following advantages.

According to the present embodiments, a zinc or zinc alloy powder is used as the negative electrode active material, oxy nickel hydroxide is used as the positive electrode active material, and the mass of the oxy nickel hydroxide is adjusted to between 3.9 and 4.4 times, inclusive, the mass of the zinc or alternatively between 3.3 and 3.8 times, inclusive, the mass of the zinc and thus, a battery voltage which is flat in the vicinity of 1.8 V to 1.55 V can be obtained for the flat alkaline primary battery 1. With the alternative ratio, the discharge potential varies stepwise and the distal potential of 1.20 V to 1.40 V can be obtained at the end of discharge.

In other words, an oxy nickel hydroxide powder, the potential of which is higher than those of manganese dioxide and silver oxide, is used as the positive electrode active material. Therefore, a battery voltage which is higher than that of alkaline manganese batteries and silver oxide batteries can be obtained. In addition, the mass of the oxy nickel hydroxide is adjusted to between 3.9 and 4.4 times, inclusive, the mass of the zinc, and thus, the battery voltage becomes flat in the same manner as with silver oxide batteries. Alternatively, the mass of the oxy nickel hydroxide is adjusted to between 3.3 and 3.8 times, inclusive, the mass of the zinc, and thus, the battery voltage in the first stage becomes flat in the same manner as with silver oxide batteries.

Accordingly, the flat alkaline primary battery 1 can be used for a long period of time in such devices as electronic wrist watches the final voltage of which is set high for the battery voltage of the silver oxide battery. In addition, no expensive materials, such as silver, are used in the flat alkaline primary battery 1, unlike in silver oxide primary batteries. Therefore, the flat alkaline primary battery 1 can be manufactured inexpensively, irrespectively of the state of the precious metals market.

In addition, with the alternative ratio, battery exhaustion can be predicted using a potential of the second stage at the end of discharge.

According to the present embodiments, the average particle diameter of the oxy nickel hydroxide in the flat alkaline primary battery 1 is 5 μm or greater and 100 μm or smaller, the ratio of particles which pass through a 100 mesh is 90% or higher, and the ratio of particles which pass through a 320 mesh is 10% or lower. Accordingly, moldability can be secured for the positive electrode mixture, the anti-leaking properties of the battery can be improved, and in addition, the reactivity of the active material is secured and flat discharge properties at the time of discharge with a high load can be maintained.

According to the present embodiments, the tap density of the oxy nickel hydroxide powder is 2.0 g/cm$^3$ or higher and 2.5 g/cm$^3$ or lower. Accordingly, the positive electrode mixture can be pressed into a mold to the required high density, so that a desired discharge capacity can be secured.

According to the present embodiments, the specific surface area of the oxy nickel hydroxide powder is 10 m$^2$/g or greater and 20 m$^2$/g or smaller. Accordingly, the reactivity of the active material can be secured, and flat discharge properties at the time of discharge with a high load can be maintained, and in addition, the mixture ratio of the oxy nickel hydroxide can be kept high in terms of the mixture ratio relative to the conductive agent, and thus, the discharge capacity can be increased.

According to the present embodiments, the moisture content in the oxy nickel hydroxide powder is 0.1% or higher and 3% or lower. Accordingly, the positive electrode mixture can be weighed more easily. In other words, when the positive electrode mixture is pressed into a mold, inconsistency in the mass of the positive electrode mixture due to the fluidity of the oxy nickel hydroxide powder (powder body) can be reduced, and thus, inconsistency in the fluctuation of the discharge capacity due to inconsistency in the mass of the oxy nickel hydroxide powder can be reduced.

According to the present embodiments, the repose angle of the oxy nickel hydroxide powder is 20 degrees or greater and 40 degrees or smaller. Accordingly, the positive electrode mixture can be weighed more easily, and inconsistency in the fluctuation of the discharge capacity due to inconsistency in the mass of the oxy nickel hydroxide powder can be reduced, as in the above.

The pressure for pressing and molding the oxy nickel hydroxide powder the mass of which is 100 mg to a columnar pellet having an outer diameter of 6.42 mm and a thickness of 1 mm is 100 MPa or higher and 500 MPa or lower. Accordingly, anti-leaking properties can be secured while the productivity of press molding is increased.

The present examples and embodiments are to be considered as illustrative and not restrictive and the invention is not to be limited to the details given herein except that may be modified within the scope and equivalence of the appended claims.

What is claimed is:

1. A flat alkaline primary battery, comprising:
a positive electrode can having an annular end portion; and
a negative electrode can having an annular end portion,
wherein the annular end portion of the negative electrode can is engaged with the annular end portion of the positive electrode can so that the positive electrode can and the negative electrode can are connected via a gasket to create an enclosed space inside the cans, wherein the enclosed space accommodates a separator, a positive electrode mixture having a positive electrode active material as a main component on the positive electrode can side, and a negative electrode mixture having a negative electrode active material as a main component on the negative electrode can side, the enclosed space being filled with an alkaline electrolyte;
wherein the positive electrode active material is oxy nickel hydroxide powder, the negative electrode active material is a zinc or zinc alloy powder, and the mass of the oxy nickel hydroxide powder is between 3.9 and 4.4 times, inclusive, the mass of the zinc or the zinc alloy;
wherein the battery has flat discharge voltage of 1.55 V to 1.80 V.

2. The battery of claim 1, wherein oxy nickel hydroxide has an average particle diameter of 5 μm or greater and 100 μm or smaller and the ratio of oxy nickel hydroxide that passes through a 100 mesh is 90% or greater and the ratio that passes through a 320 mesh is 10% or less.

3. The battery of claim 1, wherein oxy nickel hydroxide has a tap density of 2.0 g/cm$^3$ or higher and 2.5 g/cm$^3$ or lower, a specific surface area of 10 m$^2$/g or greater and 20 m$^2$/g or smaller, a moisture content of 0.1% or higher and 3% or lower, and a repose angle of 20 degrees or greater and 40 degrees or smaller, and the pressure applied to process the oxy nickel hydroxide powder the mass of which is 100 mg to a columnar pellet having an outer diameter of 6.42 mm and a thickness of 1 mm is 100 MPa or higher and 500 MPa or lower.

4. The battery of claim 1, wherein the positive electrode active material is a solid oxy nickel hydroxide in which one or more materials selected from the group consisting of zinc, aluminum, calcium, manganese, cobalt, copper and tin are dissolved.

5. The battery of claim 1, wherein the positive electrode mixture contains a solid oxy nickel hydroxide solution in which one or more materials selected from the group consisting of zinc, aluminum, calcium, manganese, cobalt, copper and tin are dissolved.

6. The battery of claim 1, wherein the positive electrode mixture includes graphite as a conductive agent, and the mixture ratio thereof is 2% or higher and 5% or lower in the mass ratio relative to the positive electrode mixture.

7. The battery of claim 6, wherein the graphite is a scale-like graphite powder.

8. The battery of claim 7, wherein the size of the crystallite of the scale-like graphite powder in the direction of axis a La (110) is 100 nm or less, the size in the direction of axis c La (004) is 100 nm or less, and the volume specific resistance in the direction of the pressure when a pressure of 150 MPa is applied is 30 mΩ·cm or less.

9. The battery of claim 1, wherein the separator is made of a microporous film and an unwoven cloth.

10. The battery of claim 1, wherein the alkaline electrolyte is a sodium hydroxide solution, a potassium hydroxide solution or a mixed solution of a sodium hydroxide solution and a potassium hydroxide solution, and a portion of the alkaline electrolyte has been added to the positive electrode mixture in advance when the positive electrode mixture is fabricated.

11. A flat alkaline primary battery, comprising:
a positive electrode can having an annular end portion; and
a negative electrode can having an annular end portion, wherein the annular end portion of the negative electrode can is engaged with the annular end portion of the positive electrode can so that the positive electrode can and the negative electrode can are connected via a gasket to create an enclosed space inside the cans, wherein the enclosed space accommodates a separator, a positive electrode mixture having a positive electrode active material as a main component on the positive electrode can side, and a negative electrode mixture having a negative electrode active material as a main component on the negative electrode can side, the enclosed space in which the positive electrode mixture, the separator, the negative electrode mixture are disposed being filled with an alkaline electrolyte;
wherein the positive electrode active material is oxy nickel hydroxide, the negative electrode active material is a zinc or zinc alloy powder, and the mass of the oxy nickel hydroxide is between 3.3 and 3.8 times, inclusive, the mass of the zinc or the zinc alloy, and a discharge potential of the battery takes two-stages at the end of discharge;
wherein the two-stages comprise a first stage of 1.55 V to 1.80 V and a second stage of 1.20 V to 1.40 V.

12. The battery of claim 11, wherein oxy nickel hydroxide has an average particle diameter of 5 μm or greater and 100 μm or smaller and the ratio of oxy nickel hydroxide that passes through a 100 mesh is 90% or greater and the ratio that passes through a 320 mesh is 10% or less.

13. The battery of claim 11, wherein oxy nickel hydroxide has a tap density of 2.0 g/cm$^3$ or higher and 2.5 g/cm$^3$ or lower, a specific surface area of 10 m$^2$/g or greater and 20 m$^2$/g or smaller, a moisture content of 0.1% or higher and 3% or lower, and a repose angle of 20 degrees or greater and 40 degrees or smaller, and the pressure applied to process the oxy nickel hydroxide powder the mass of which is 100 mg to a columnar pellet having an outer diameter of 6.42 mm and a thickness of 1 mm is 100 MPa or higher and 500 MPa or lower.

14. The battery of claim 11, wherein the positive electrode active material is a solid oxy nickel hydroxide in which one or more materials selected from the group consisting of zinc, aluminum, calcium, manganese, cobalt, copper and tin are dissolved.

15. The battery of claim 11, wherein the positive electrode mixture contains a solid oxy nickel hydroxide solution in which one or more materials selected from the group consisting of zinc, aluminum, calcium, manganese, cobalt, copper and tin are dissolved.

16. The battery of claim 11, wherein the graphite is a scale-like graphite powder.

17. The battery of claim 16, wherein the size of the crystallite of the scale-like graphite powder in the direction of axis a La (110) is 100 nm or less, the size in the direction of axis c La (004) is 100 nm or less, and the volume specific resistance in the direction of the pressure when a pressure of 150 MPa is applied is 30 mΩ·cm or less.

18. The battery of claim 11, wherein the alkaline electrolyte is a sodium hydroxide solution, a potassium hydroxide solution or a mixed solution of a sodium hydroxide solution and a potassium hydroxide solution, and a portion of the alkaline electrolyte has been added to the positive electrode mixture in advance when the positive electrode mixture is fabricated.

* * * * *